Figure 1:
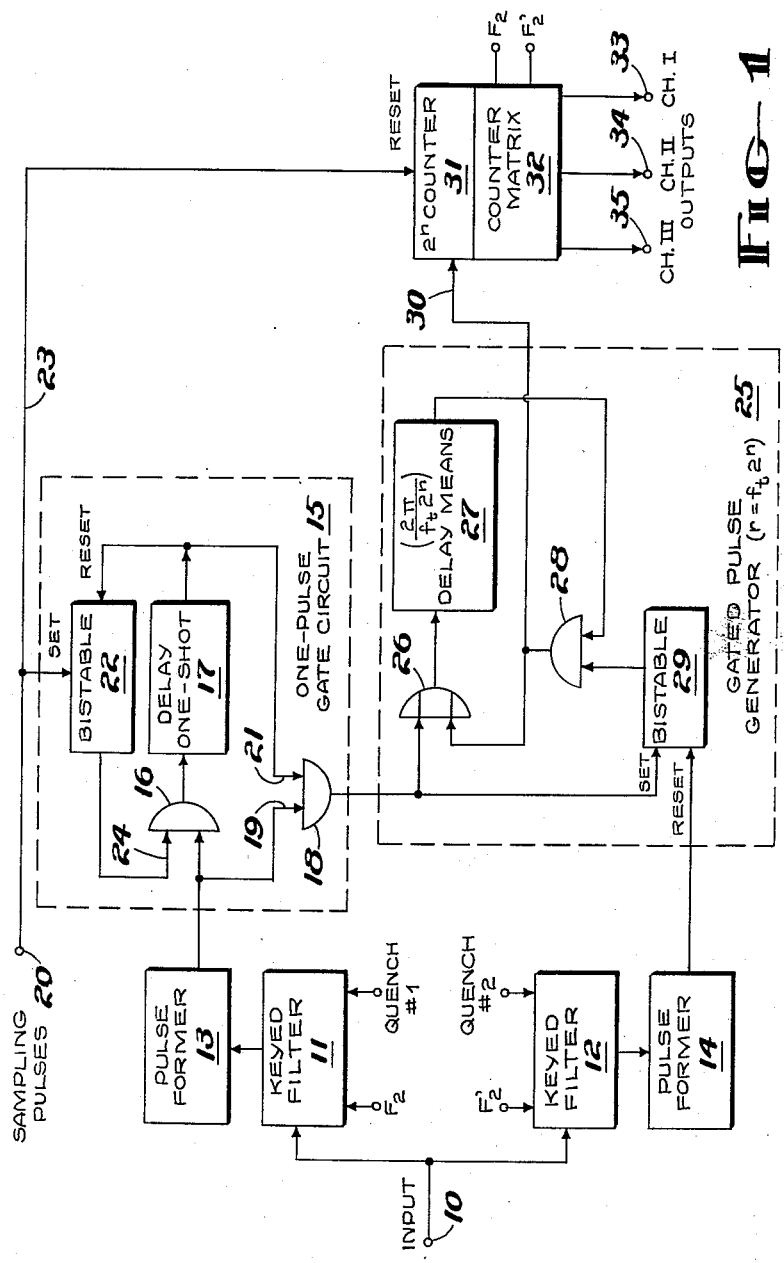

INVENTOR
ARTHUR GARABEDIAN

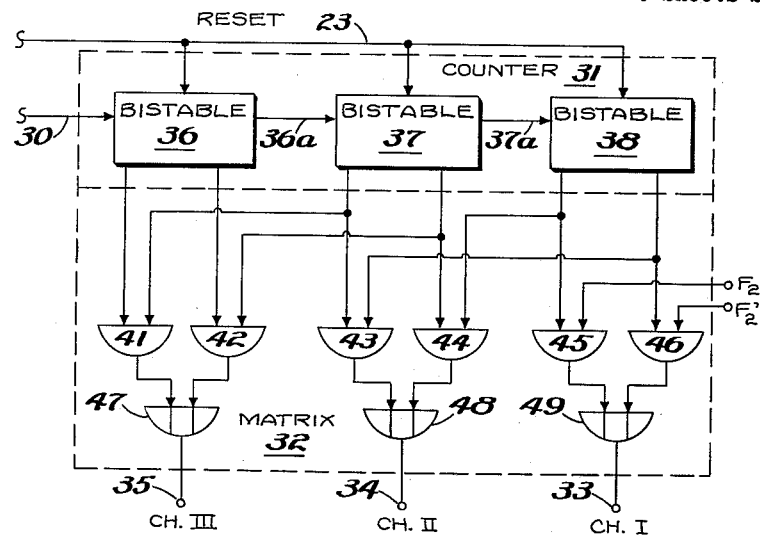
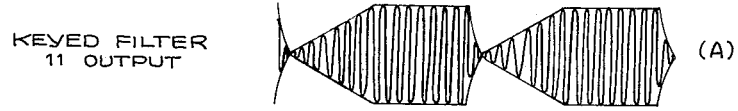
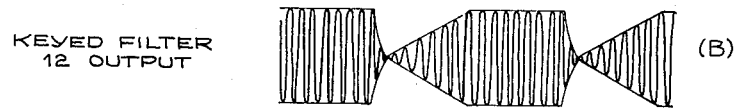
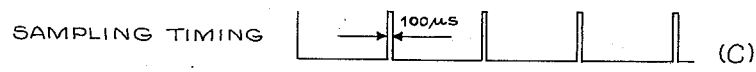
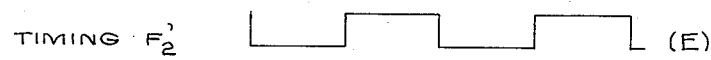

Dec. 12, 1961  A. GARABEDIAN  3,013,211
COUNTER TYPE PHASE-PULSE DETECTOR
Filed Nov. 20, 1959  6 Sheets-Sheet 4

INVENTOR
ARTHUR GARABEDIAN
BY Moody and Goldman
ATTORNEYS

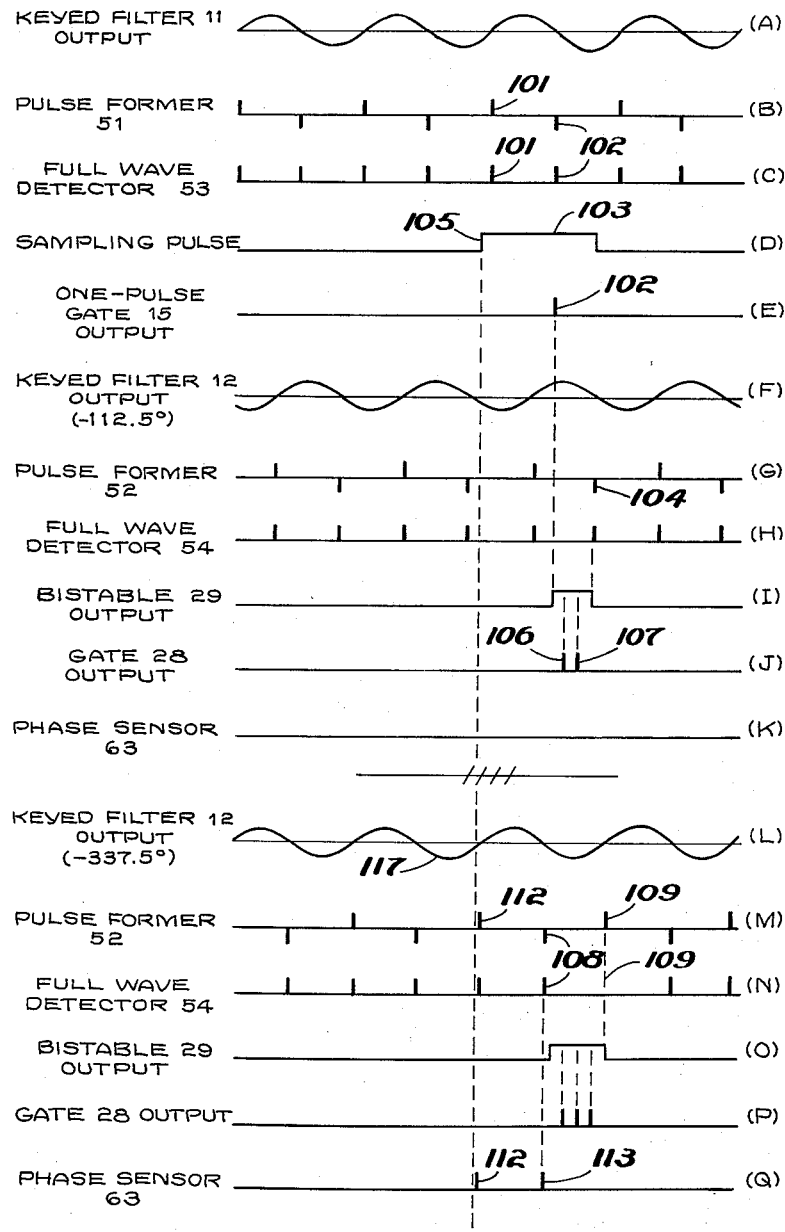

Dec. 12, 1961  A. GARABEDIAN  3,013,211
COUNTER TYPE PHASE-PULSE DETECTOR
Filed Nov. 20, 1959
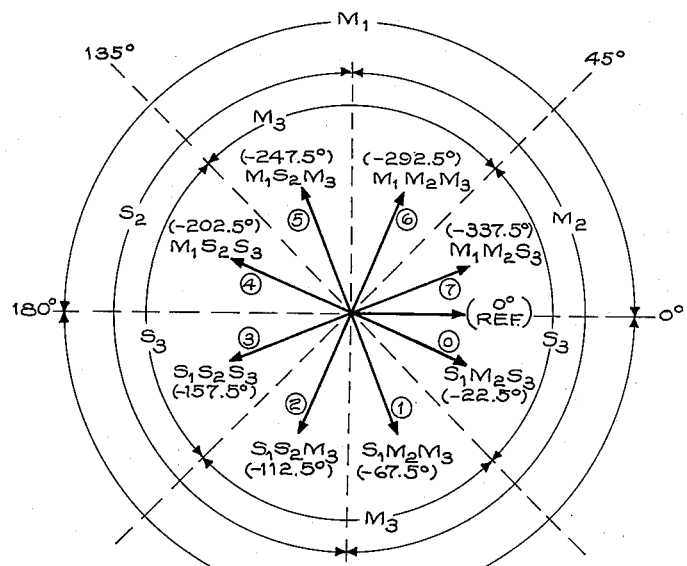
FIG-8(A)
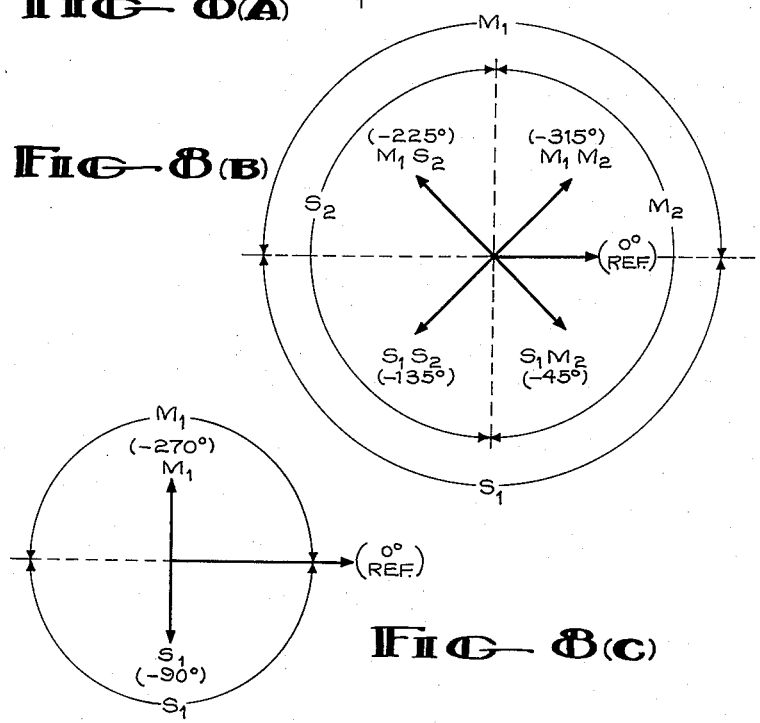
FIG-8(B)
FIG-8(C)
INVENTOR
ARTHUR GARABEDIAN

United States Patent Office 3,013,211
Patented Dec. 12, 1961

3,013,211
COUNTER TYPE PHASE-PULSE DETECTOR
Arthur Garabedian, Hollywood, Calif., assignor to Collins Radio Company, Cedar Rapids, Iowa, a corporation of Iowa
Filed Nov. 20, 1959, Ser. No. 854,411
13 Claims. (Cl. 328—109)

This invention relates to digital detectors of a phase-pulsed tone capable of carrying one or plural simultaneous binary channels.

One prior type of digital phase-pulse detector is described and claimed in U.S. patent application Serial No. 769,456, filed October 24, 1958, titled, "Digital Phase-Pulse Demodulator," by Frank Secretan, and assigned to the same assignee as the present application. Another type of phase-pulse detector is described and claimed in U.S. patent application Serial No. 838,960, filed September 9, 1959, titled, "Digital Phase-Pulse Detector," by Donald L. Martin, and assigned to the same assignee as the present application.

The Secretan demodulator uses the resetting operation of a chain of bistable circuits which store the phase of a prior phase-pulse. The resetting is done by a pulse having a timing derived from the phase of each new phase-pulse. The output of the chain of bistable circuits is sensed at the instant of reset. The resetting operation demodulates the phase-shift between phase-pulses by detecting the direction of reset for the last $n$ number of the bistable circuits. Differentiating circuits connected to the outputs of the last $n$ number of bistable circuits detect the directions of reset by the polarities of their output pulses; and they provide simultaneously the outputs for $n$ number of channels in binary-numbered form, which must be decoded into the $n$ separate channels.

On the other hand, the Martin detector generates from a pair of sequentially received phase-pulses, which are stored, a square wave and a sharp-pulsed wave, respectively. The opposite half-cycles of the square wave define phase-domains which are used to identify mark (M) and space (S) phase regions. Hence, a mark or a space is detected according to whether a sharp pulse occurs in a mark or space phase-domain of the square wave. Where more than one channel is being carried by a received tone, either plural square waves or plural sharp-pulsed waves are formed simultaneously from the stored or the incoming phase-pulses. The number of rectangular or sharp-pulsed waves so formed is equal to the number of channels carried by the received tone. The plural waves are phased with each other according to a coding choice for phase-doman relationships among the channels. A coding choice determines the phase relationships among the domains of the respective channels. With some plural-channel codings, the phase-domains for a specific type of data-bit (mark or space) in a given channel cannot be represented by a square wave at the frequency of the received tone, but must be represented by a square wave at a multiple frequency of the tone. Optimum coding provides a minimum of such frequency multiplication. Where only one or two channels are carried by a phase-pulsed tone, there is no need for frequency multiplication. However, where the number of encoded channels exceeds two, it becomes necessary to use a higher frequency for a square wave representing the phase-domains for the third and higher order channels. Thus, where three channels are encoded on a tone, a coding choice is available in which the third channel has its mark and space phase-domains represented by a square wave at twice the tone frequency and being properly phased with it.

The present invention is an improvement upon the Martin phase-pulse detector for certain applications and uses a gated counter, rather than direct-current levels, to detect the received information.

It is therefore a primary object of this invention to provide a digital phase-pulse detector which is capable of simpler construction than prior phase-pulse detectors, when the number of channels per modulated tone exceeds two.

Another object of this invention is to provide a phase pulse detector that obtains the advantages of digital detection over analogue type phase-pulse detectors.

It is another object of this invention to provide a digital phase-pulse detector which, if constructed for a given number of channels per tone, can demodulate any lesser number of channels carried in an optimum manner by the tone.

It is a further object of this invention to provide a phase-pulse detector which is operable with received waves having phase errors up to their theoretical maximum tolerances, as defined by any given phase-pulse code.

Figure 2:
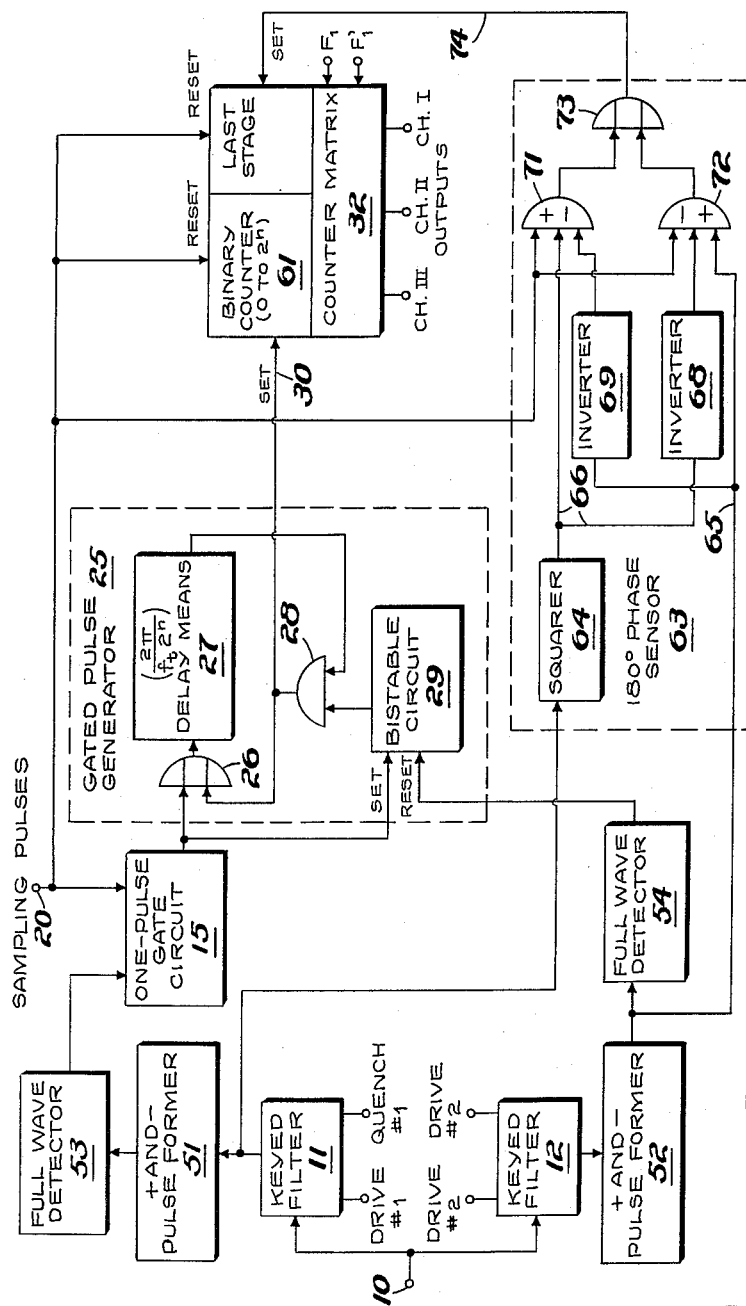
Figure 6:
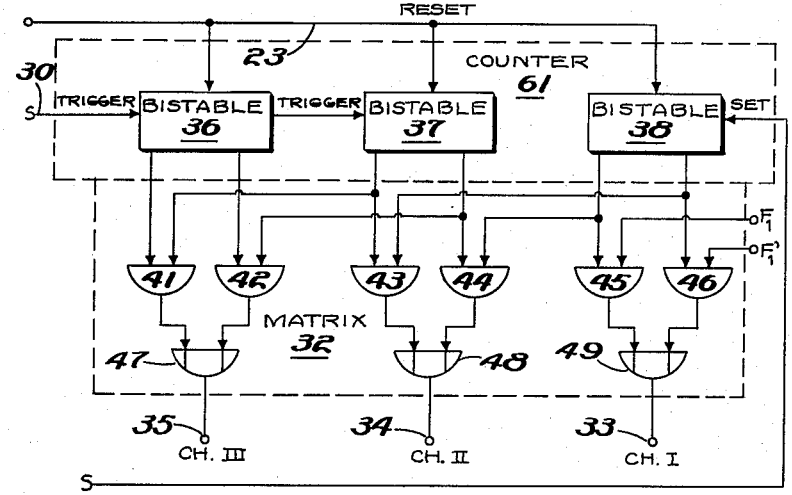

Further objects, features and advantages of this invention will become apparent to one skilled in the art upon further study of the specification and accompanying drawings, in which:

FIGURE 1 illustrates an embodiment of the invention;
FIGURE 2 illustrates the embodiment of FIGURE 1 with additional refinements;
FIGURE 3 shows a counter and matrix usable in FIGURE 1;
FIGURES 4(A)–(E) provide wave-forms synchronized with the bit rate of a received signal;
FIGURES 5(A)–(M) are wave-forms used in explaining the operation of FIGURE 1.
FIGURE 6 is a counter and matrix diagram usable in the system of FIGURE 2;
FIGURES 7(A)–(Q) are wave-forms used in explaining the operation of the system in FIGURE 2; and,
FIGURES 8(A)–(C) provide vector diagrams showing particular phase-pulse codings for a received tone usable in the systems of FIGURES 1 and 2.

The embodiment of FIGURE 1 includes an input terminal 10 which receives a synchronously phase-pulsed tone which is digitally modulated with $n$ number of independent channels of binary information, where $n$ may be one or any higher positive integer. The signal provided at terminal 10, for example, may be received over a telephone line, or it may be the heterodyned output of a radio receiver.

The detection process of a phase-pulsed tone requires a phase comparison between sequentially received phase-pulses to determine the phase-shift between them. This phase comparison is most accurately done by averaging (integrating) the phase over the period of each received pulse, and storing its phase during the next bit period. At the end of each received pulse a phase comparison is made between its average phase and the average phase of the stored prior bit.

In FIGURE 1, keyed filters 11 and 12 have inputs respectively connected to terminal 10. The keyed filters have the well-known purpose of averaging (integrating) received phase-pulse pulses and storing their averaged phase by ringing for following bit periods. Two keyed filters are used so that one can be averaging the phase of a pulse being received, while the other is storing the phase of the prior pulse. Hence, they alternate their functions as phase-pulses are received.

FIGURES 4(A) and (B) illustrate the alternate operations of keyed filters 11 and 12, wherein a received phase-pulse is being averaged by one filter during its build-up period; while the phase of the prior phase-pulse is being stored by constant amplitude ringing.

FIGURE 4(C) illustrates sampling timing pulses, which are provided at the end of each bit period in order to make a comparison between the phase of a newly received and of a preceding pulse.

FIGURES 4(D) and (E) provide opposite-phased square waves $F_2$ and $F'_2$ which are synchronized with the received phase-pulses but are at one-half their rate by means that are not part of this invention.

A pair of pulse formers 13 and 14, in FIGURE 1 are connected to the outputs of respective keyed filters 11 and 12. Each of the pulse formers generates a pulse at each positive-going axis crossing of the wave received from its keyed filter. Hence, each pulse former in FIGURE 1 generates one pulse-per-cycle, which is timed with the specified axis crossing. The axis crossings have maximum timing accuracy during the periods of the sampling pulses shown in FIGURE 4(C), which occur at the end of the averaging process of a phase-pulse.

The means for deriving the synchronous timing for waves $F_2$ and $F'_2$, quench #1 and #2, and the sampling pulses may be obtained from U.S. patent application Serial No. 502,045, filed April 18, 1955, by Melvin L. Doelz and Dean F. Babcock, titled, "High Information Capacity Phase-Pulse Multiplex System," and assigned to the same assignee as the present application.

A one-pulse sampling gate circuit 15 receives the output of pulse former 13, and also receives sampling pulses from a terminal 20. After each sampling pulse, one output pulse from former 13 is premitted to pass through gate circuit 15 to its output 20.

Circuit 15 is comprised of a pair of "and" gates 16 and 18, each having an input connected to the output of pulseformer 13. A delay one-shot multivibrator 17 is connected to the output of gate 16. One-shot 17 provides a delay of from one to two periods of the frequency of the tone being detected. A bistable circuit 22 has a reset input connected to the output of delay one-shot 17, which is also connected to another input of gate 18. A set input to bistable 22 is connected to terminal 20 to receive the sampling pulses and is triggered by the leading edge of each sampling pulse.

Another input of gate 16 is connected to an output of bistable 22. Whenever a sampling pulse is received, bistable 22 is set to enable gate 16. Hence, the first pulse from former 13 received after the beginning of a sampling pulse triggers delay one-shot 17. But, this pulse cannot pass through gate 18 because it has not yet been enabled by one-shot 17. Immediately thereafter, input 21 is enabled for a period between one and two cycles of the tone frequency, which is only long enough to pass the next pulse from former 13. At the end of the delay period of one-shot gate 17, gate 18 is disabled and bistable 22 is reset to disable gate 16 so that one-shot 17 cannot be triggered again until the next sampling pulse is provided. Thus, one and anly one pulse from former 13 is permitted to pass to the output of gate circuit 15 per sampling pulse. The single passed pulse has a timing dependent on the phase of keyed filter 11. Thus a one-pulse gate permits the passage of one and only one pulse from a received sequence of pulses in response to an enablement from another pulse source.

A gated pulse generator 25 receives the output of gate circuit 15 and generates pulses proportional in number to the phase between phase-pulses being compared.

Generator 25 is triggered on by the passed pulse from gate circuit 15, and is triggered off by a pulse from pulseformer 14, which is dependent upon the phase in the other keyed filter 12.

The minimum pulse rate for generator 25 is $f_t 2^n$ while it is gated on, where $f_t$ is the frequency of the tone being detected and $n$ is the number of independent channels carried by it. The generator rate may be any integer multiple of this amount, but preferably the minimum rate is used. The preferred operation of generator 25 should time its output pulses so that they are spaced by a maximum amount from the on and off switching of the gating function to avoid interference with the terminal pulses in any gating sequence.

A system is illustrated in FIGURE 1, which particularly obtains the preferred type of gate-generator operation. It includes an "or" gate 26 having an input connected to the output of circuit 15. A delay means 27, which may be passive, is connected to the output of gate 26. Delay means 27 provides a delay of $$\frac{2\pi}{f_t 2^n}$$

An "and" gate 28 has an input connected to the output of delay means 27 and has an output connected to another input of "or" gate 26. Hence, a feed-back loop is provided about delay means 27, which can sustain a pulse oscillation at a rate of $f_t 2^n$ after a starting pulse is provided from gate 15, as long as "and" gate 28 is enabled.

A bistable circuit 29 controls the enablement of "and" gate 28. Bistable 29 has a set input connected to the output of one-pulse circuit 15, and has a reset input connected to the output of pulse former 14. Hence, bistable 29 enables the oscillation of generator 25 only during the period between a sampled pulse from circuit 15 and the next occurring pulse from pulse former 14.

Because the pulse from circuit 15 starts each gated oscillation in generator 25, the oscillatory pulses will always have a fixed phase relationship to the pulse from gate circuit 15. Accordingly, the first pulse appearing on an output lead 30 of generator 25 will always be delayed by $$\frac{1}{2^n}$$

of a tone cycle behind the pulse provided from gate circuit 15. Furthermore, the phase coding for the tone received at terminal 10 prevents any coincidence between the pulses at the outputs of formers 13 and 14. This permits the termination of the gating of generator 25 to be approximately midway between adjacent pulses from generator 25. Hence, it is apparent that the on-off switching function of generator 25 is separated significantly in time from its output pulses. Consequently, the switching operation of generator 25 should not distort the first and last pulses of any gated sequence.

A binary counter 31 measures the number of pulses in any gating sequence and provides an output count proportional to the phase-shift between phase-pulses being compared. Counter 31 provides a count of at least $2^n$.

A counter matrix 32 is associated with counter 31 in order to correlate the counts in a generated sequence with the information detected for the respective channels. Timing waves $F_2$ and $F'_2$ are connected to counter matrix 32 in order to prevent any ambiguity in the data which might arise due to the alternate operation of keyed filters 11 and 12, which alternates the zero phase reference between the keyed filters. This alternate effect is treated in detail in the above-cited patent application of Martin. Briefly it may be resolved by alternately reversing the connection of the outputs of keyed filters 11 and 12 to pulse formers 13 and 14 at the $F_2$ rate; or it may be resolved by switching the ambiquous detected output at the $F_2$ rate. The latter is done in FIGURE 1.

FIGURE 3 illustrates a detailed form of counter 31 and matrix 32 for detecting three channels simultaneously. The counter comprises $n$ number of bistable circuits, wherein $n$ is three in FIGURE 3. Thus, bistable circuits 36, 37 and 38 are shown connected in the conventional manner. The leading edges of the sampling pulses from lead 23 reset each of the bistables.

Matrix 32 is designed according to the phase-pulse coding given in FIGURE 8(A) for a received tone. With this coding, the phase shift between two adjacent phase-pulses can be any one of the eight vectors varying in angle from $-22.5°$ through $-337.5°$. Each of these eight phase shifts will carry three bits of information, one bit for each of three channels. Each bit is either mark (M) or a space (S), with a subscript indicating its respective channel. The zero reference phase is always the phase of the prior phase-pulse in any phase comparison. Hence, the last phase-pulse in any comparison has its phase represented by one of the eight vectors.

The timing between the setting and resetting of bistable 29 is proportional to the phase-shift between the compared phase-pulses; and generator 25 provides from zero through seven pulses during a gating interval to measure which of the respective eight phase-shifts was received. Hence, the encircled number by each of the vectors in FIGURE 8(A) correlates the number of pulses in a gating sequence with the respective phase-shifts. The following table provides the correlation between the output states of the counters in FIGURE 3 and the channel-decoded matrix outputs.

| No. of Sequence Pulses | Ctr. 36 | Ctr. 37 | Ctr. 37 | Ch. I | Ch. II | Ch. III |
|---|---|---|---|---|---|---|
| 0 | 0 1 | 0 1 | 0 1 | 1 | 0 | 1 |
| 1 | 1 0 | 0 1 | 0 1 | 1 | 0 | 0 |
| 2 | 0 1 | 1 0 | 0 1 | 1 | 1 | 0 |
| 3 | 1 0 | 1 0 | 0 1 | 1 | 1 | 1 |
| 4 | 0 1 | 0 1 | 1 0 | 0 | 1 | 1 |
| 5 | 1 0 | 0 1 | 1 0 | 0 | 1 | 0 |
| 6 | 0 1 | 1 0 | 1 0 | 0 | 0 | 0 |
| 7 | 1 0 | 1 0 | 1 0 | 0 | 0 | 1 |

As a result, matrix 32 comprises "and" gates 41–46 which have inputs interconnected with the counter outputs as shown. Three "or" gates 47, 48 and 49 receive outputs of respective pairs of "and" gates; and the "or" gates provide the three channel outputs to terminals 33, 34, and 35. The phase reversal ambiguity of the keyed filters occurs only with respect to channel I with the coding of FIGURE 8(A). The ambiguity is resolved by connecting the timing waves $F_2$ and $F'_2$ to inputs of "and" gates 45 and 46.

Whenever the system of the invention is designed for a particular number of channels per tone, it can also detect an optimum phase-pulse code for a fewer number of channels per tone. Thus, a three channel system for detecting the coding of FIGURE 8(A) can also detect the two channel per tone optimum code in FIGURE 8(B) and the single channel per tone optimum code of FIGURE 8(C). Whenever a lesser number of channels is used, the higher-order unused channel outputs are ignored. The coding correlation between FIGURES 8(A), (B), and (C) becomes apparent by examining their respective angular or phase domains for marks and spaces for the respective channels. Thus, it is noted that FIGURE 8(B) uses the same phase domains for $M_1$ and $S_1$, and for $M_2$ and $S_2$ as were found in FIGURE 8(A). Likewise, the single channel coding in FIGURE 8(C) uses the same phase domains as in the dual-channel coding in FIGURE 8(B) and the triple-channel coding in FIGURE 8(C). Accordingly, any phase-shift falling into the range of a given phase-domain will be recognized as the vector designated in the respective domain; and this permits a significant phase-error tolerance for the vectors.

Figure 5:
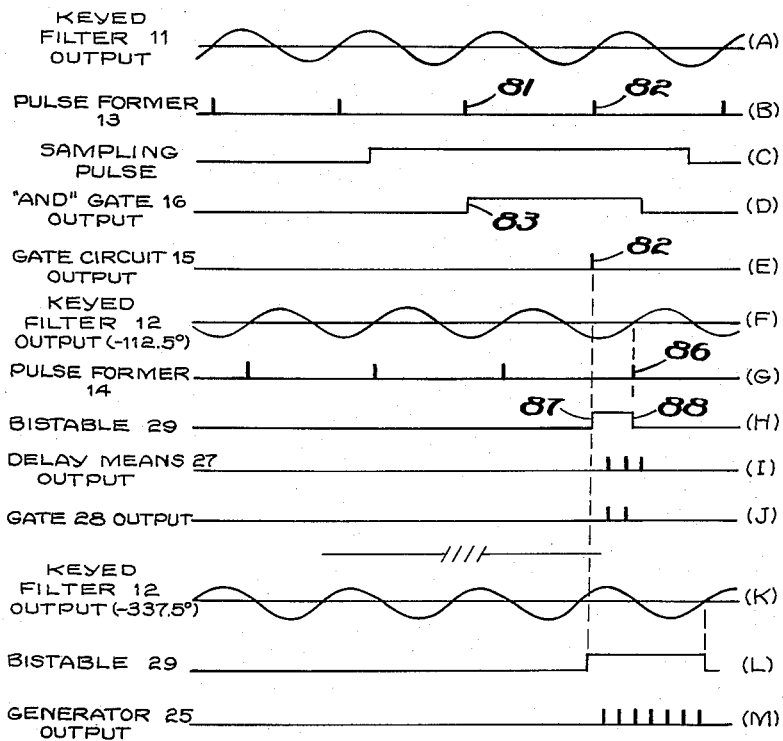

The operation of the system in FIGURE 1 can be explained using the timing wave-forms shown in FIGURES 5(A)–(M). FIGURE 5(B) illustrates the pulsed output of pulse-former 13, which corresponds to the positive-going axis crossings of the output of keyed filter 11, shown in FIGURE 5(A). FIGURE 5(C) shows any one of the sampling pulses in FIGURE 4(C), and its leading edge occurs more than a cycle of tone frequency $f_t$ before the integrated signal has been quenched.

It makes no difference whether the beginning of a sampling pulse coincides with a pulse from pulse-former 13, since such pulse will be rejected if coincidence exists due to the time needed to sequentially trigger one-shot 17, bistable 22 and to enable gate 16. Hence, the first pulse from former 13 after the beginning of a sampling pulse passes through gate 16 to trigger one-shot 17; however, this first pulse cannot pass to the output of circuit 15, because gate 18 is not enabled soon enough by the one-shot to pass the pulse. The next pulse from former 13 will thus find gate 18 enabled and will pass to the output of circuit 15 as its only pulse, until the next sampling pulse is provided. Before any following pulse can pass through gate 18, it is closed, since the duration of one-shot 17 is not sufficiently long to enable more than one pulse to pass through gate circuit 18. FIGURE 5(E) illustrates the single pulse output of circuit 15.

FIGURE 5(H) illustrates the output of bistable 29, which is set by pulse 82 from gate circuit 15 to provide a leading edge 87. Bistable 29 then enables "and" gate 28 and the oscillatory feed-back. Hence, the single pulse 84 from gate circuit 15 passes through "or" gate 26 and appears at the output of the delay line at $$\frac{1}{2^n}$$

of a period of $f_t$ later. For example, if three channels are used, delay means 27 provides a delay of 45° and has a pulse rate of eight times the tone rate $f_t$.

The pulse continues to recirculate through the delay line via the feed-back loop until "and" gate 28 is disabled by a resetting of bistable 29. The resetting occurs in response to a next occurring pulse received from former 14, thus providing the response illustrated in FIGURE 5(H), wherein trailing edge 88 corresponds to the next occurring pulse 86 from pulse former 14, as shown in FIGURE 5(G). In FIGURE 5(F), the keyed-filter output is presumed to have an angle of −112.5° which phases the pulses in FIGURE 5(G) relative to FIGURE 5(A). Two pulses are permitted to pass through gate 28 to lead 30 during the gating period of generator 25. A final pulse, that is traveling down delay means 27 when bistable 29 is reset, finds gate 28 closed and does not appear on output lead 30. Accordingly, the two pulses shown in FIGURE 5(J) represents a −112.5° phase-shift, which carries the information $S_1S_2M_3$, according to the coding in FIGURE 8(A).

FIGURE 5(K) illustrates another example having a phase-shift of −337.5°. Thus, bistable circuit 29 will have the response shown in FIGURE 5(L); and FIGURE 5(M) illustrates the corresponding output from generator 25 of the seven pulses corresponding to this phase-shift.

In order to minimize or eliminate cross-talk in multi-tone phase-pulse systems, the sampling time should be at $$\frac{n}{\Delta f}$$

from the beginning of an integration, where $n$ is an integer and $\Delta f$ is the spacing between tone frequencies. Where the tones are not synchronized with each other, a zero-crossing in a positive-going direction can be assured only in a minimum range of one $f_t$ cycle from the $$\frac{n}{\Delta f}$$

instant. On the other hand, either a positive or a negative going zero-crossing can be assured within one-half an $f_t$ cycle from the $$\frac{n}{\Delta f}$$

instant.

Thus, in the embodiment of FIGURE 1, it is required that the sampling pulses have a leading edge that must be over one tone cycle from the end of an integration, which generally occurs at the $$\frac{n}{\Delta f}$$

instant.

However, another embodiment shown in FIGURE 2 allows either a positive or a negative going crossing to be used. Accordingly, the sampling instant can then be as close as one-half an $f_t$ cycle from the $$\frac{n}{\Delta f}$$

instant. This is accomplished in the embodiment of FIGURE 2 by adding a phase sensor 63 to a system otherwise similar to FIGURE 1, with only a few modifications.

Items in FIGURE 2 which are identical to those in FIGURE 1 have the same reference numbers. In FIGURE 2, pulse-formers 51 and 52 generate pulses from both axis-crossings during each cycle. Conventional types of pulse-formers will generate a positive pulse from a positive-going axis crossing, and will generate a negative pulse from a negative-going axis crossing.

Full-wave detectors 53 and 54 are provided at the outputs of pulse formers 51 and 52 to rectify their pulses to the same polarity, which is assumed positive in this example. Thus, the outputs of the pulse-formers in FIGURE 2 have only one-half the pulse-spacing that was obtained at the output of the pulse-formers in FIGURE 1.

The only internal difference between circuit 15 in FIGURE 2 and circuit 15 in FIGURE 1 is that the delay one-shot in circuit 15 of FIGURE 2 should provide a delay between one-half and one tone cycle rather than between one and two tone cycles, as in FIGURE 1, in order to prevent passage of more than one pulse. Accordingly, a reduction of the order of one-half a tone cycle is obtained for the sampling pulses, and they may be timed closer by this amount in FIGURE 2 to the ends of the phase-pulse averaging periods.

Since the operation of the system of FIGURE 2 occurs within one-half cycle of the tone period, no more than three pulses can be gated from gate generator 25. This causes an ambiguity between the phase shifts in FIGURE 8(A) that are less than 180°, and those that are greater than 180°. For example, the —22.5° and the —202.5° phase-shifts each cause zero pulses to pass to lead 30. And by the same token, the —157.5° phase shift, and the —337.5° phase shifts each cause three pulses to appear on lead 30. This ambiguity is resolved by determining whether the pulses of a particular polarity from pulse former 52 occur during a positive or a negative one-half cycle from keyed filter 11. Thus, if a positive pulse from former 52 falls in a negative one-half cycle from filter 11, or vice-versa, a phase-shift of greater than 180° has occurred. On the other hand, a positive pulse from former 52 occurring during a positive $f_t$ cycle from filter 11, or vice-versa, indicates that a phase-shift of less than 180° has occurred.

A phase sensor 63 senses this 180° condition. If it senses a phase-shift greater than 180°, it triggers the last stage of binary counter 61 to add an additional four counts to the total. If it senses a phase-shift less than 180°, sensor 63 provides no pulse to leave the total unchanged. Consequently, the resulting outputs of binary counter 61 will have the same total as given in the above table and as described in connection with FIGURES 1, 6 and 8(A). Hence, the same matrix 32 may be used in both cases.

Sensor 63 includes a wave squarer 64 connected to the output of filter 11. Squarer 64 merely makes a square wave from a sine wave received from the filter. Squarer 64 is not theoretically essential, but is provided because gates perform better with constant level signals than with varying signals.

A pair of "and" gates 71 and 72 each have an input connected to the output of squarer 64, although this input to gate 72 is connected through inverter 68. Both "and" gates are presumed in this embodiment to be of the type which must have all three inputs positive before a positive signal is provided at its output. Hence, a positive one-half cycle from filter 11 will enable gate 71, and a negative one-half cycle will enable gate 72. The pulsed output of former 52 is connected to other inputs of gates 71 and 72, except that the input to gate 71 is provided through an inverter 69. Hence, positive pulses from former 52 will enable gate 72 and negative pulses will enable gate 71.

Both gates 71 and 72 have inputs connected to terminal 20 to receive sampling pulses. Thus, during any sampling pulse, gate 71 provides an output only if former 52 provides a negative pulse during a positive one-half cycle of filter 11; and gate 72 provides an output only if a positive pulse from former 52 occurs during a negative one-half cycle from filter 11. Hence, one of gates 71 or 72 will provide a pulse under conditions indicating that a phase-shift greater than 180° has occurred. During this condition, any pulse from gates 71 or 72 will pass through an "or" gate 73 as a positive pulse to the output of sensor 63 during the period of a sampling pulse to trigger the last stage of counter 61. The last stage of the counter is reset to a zero condition at the beginning of each sampling pulse, and is set by a positive pulse from sensor output lead 74. It makes no difference how many positive pulses are provided on lead 74 during a sampling pulse, because they will all have the same effect upon the setting of the last counter stage.

FIGURE 6 illustrates a detailed form of counter 61 and matrix 32. Counter 61 is made of the same bistable circuits that comprise counter 31 in FIGURE 3. However, they are connected differently in FIGURE 6. Lead 74 is connected to a set input of last bistable 38; and there is no connection between bistables 37 and 38 except for their reset inputs, which are triggered by the leading edges of the sampling pulses.

FIGURES 7(A)–(Q) illustrate examples of operation for FIGURE 2. Thus, FIGURE 7(B) illustrates the output of pulse former 51 corresponding to a reference wave from keyed filter 11 illustrated in FIGURE 7(A); and FIGURE 7(C) illustrates the corresponding output of full-wave detector 53. Pulse 102 from former 52 is the only pulse permitted to pass through gate circuit 15, as shown in FIGURE 7(E), in response to a sampling pulse 103 shown in FIGURE 7(E).

In a like manner, FIGURES 7(G) and (H) illustrate outputs of pulse former 52 and full-wave detector 54, in response to a phase-pulse which lags the reference wave of keyed filter 11 by —112.5° to obtain the keyed filter output, shown in FIGURE 7(F).

Hence, gated generator 25 becomes oscillatory when its bistable 29 is enabled by pulse 102 of FIGURE 7(E). The oscillatory operation of generator 25 ends when bistable 29 is disabled by a pulse 104 in FIGURE 7(G) which is the first pulse from former 52 to follow pulse 102. The output of bistable 29 is shown in FIGURE 7(I). Consequently, two pulses 106 and 107 shown in FIGURE 7(J) pass to lead 30 to identify the —112.5° phase-shift.

It will be noted in FIGURE 7(K) that no pulses were provided from sensor 63, and consequently, the counter remained at count two to indicate the —112.5° phase-shift.

An example of a greater than 180° phase-shift is illustrated by FIGURES 7(L)–(Q), in which FIGURES 7(L), (M) and (N) illustrate corresponding outputs from filter 12, former 52 and detector 54 for a —337.5° phase-shift. The reference wave of FIGURE 7(A) and sampling pulse of FIGURE 7(D) are utilized with FIGURES 7(L)–(Q). Hence, bistable 29 is set by pulse 102 and is reset by the next pulse 109 provided from full-wave detector 54 shown in FIGURE 7(M). The switching of bistable 29 is shown in FIGURE 7(O), and it permits three generator pulses shown in FIGURE 7(P) to pass to lead 30.

However, sensor 63 is receiving a negative one-half cycle 117 from filter 11 at the same time that it receives a positive pulse 112 from former 52 immediately after the sampling pulse begins. Thus, pulse 112 passes gate 72 and triggers the last stage of counter 61 to add four more counts to the counter output. Since the next pulse from former 52 also finds gate 72 enabled by the sampling pulse, a second pulse 113 passes through gate 71 to the set input of the last counter stage. However, second set pulse 113 does not affect the counter output, since it merely retains the same setting that was caused by the first pulse 112. Hence, it makes no difference how many pulses pass from the output of sensor 63 in response to a sampling pulse, since they will all cause a four count read-out to be added to whatever counts were received from pulse generator 25. Thus, seven counts total at the output of counter 61 to indicate the —337.5 phase-shift in FIGURE 8(A).

The principles of the invention have been described and illustrated in operative systems for the purpose of teaching those skilled in the art how the invention may be performed. Changes in the components, units and assemblies will appeal to those skilled in the art, and it is contemplated that such changes may be employed, but yet fall within the spirit and scope of the claims that are to follow.

I claim:

1. A system for detecting data modulated as phase-pulses onto a carrier frequency by synchronous phase shifts, there being plural discrete phase-shifts coded for $n$ number of channels of digital data, comprising first means for storing the phase of one phase-pulse at a time, second means for storing the phase of each preceding phase-pulse, a first pulse-former connected to an output of said first storing means, and a second pulse-former connected to an output of said second storing means, one-pulse gate-circuit means connected to an output of said first pulse-former to pass one pulse from it in response to a single sampling enablement, means for providing sampling pulses to said one-pulse gate circuit means, to enable it, said sampling pulses timed with the ends of said phase-pulses, a gated pulse generator having enablement and disablement inputs, with said enablement inputs receiving an output of said one-pulse gate circuit means, said disablement input receiving an output of said second pulse-former means, a pulse counter receiving an output of said gated pulse generator for counting a sequence of pulses obtained between enablement and disablement of said gated pulse generator, and means for resetting said counter prior to each counting sequence, wherein the counts of said counter provide a detected form of said phase-pulses.

2. A system, as defined in claim 1, in which said gated pulse generator includes a delay means having a delay of $$\frac{1}{2^n}$$

part of a cycle from said first pulse former, an "or" gate having an output connected to an input of said delay means, one input of said "or" gate connected to said enablement input of said gated pulse generator, an "and" gate having an output connected to another input of said "or" gate, and an input of said "and" gate being connected to an output of said delay means, bistable means having first and second inputs connected to the enablement and disablement inputs of said generator, an output of said bistable means connected to another input of said "and" gate, and an output of said "and" gate connected to an input of said pulse counter.

3. A system, as defined in claim 1 in which said pulse counter can count from 0 to $2^n$, said counter having a reset input connected to said sampling pulse means, and being reset by beginnings of each of said sampling pulses.

4. A system, as defined in claim 3, having a matrix with at least $2n$ inputs and $n$ outputs, with said $2n$ inputs connected to outputs of said counter, said matrix translating a binary output of said counter into a sequential output of its $n$ outputs.

5. A system, as defined in claim 4, in which a timing source is provided having one-half the rate of said phase-pulses and being synchronized with them, said timing source being connected to said matrix for alternately inverting its outputs having an alternate ambiguity caused by alternate storing of phase-pulses by said first and second storing means.

6. A system, as defined in claim 1, in which said pulse-formers each generate one pulse per received cycle at a specified axis crossing.

7. A system, as defined in claim 6, in which said one-pulse gate-circuit means comprises an "and" gate having an input connected to an output of said first pulse-former, a delay means for providing a delay of between one and two cycles of a wave received by said pulse-former, said delayed means having an input connected to an output of said first "and" gate, a bistable means having a reset input connected to an output of said delay means and having a set input connected to said sampling pulse means, another input of said first "and" gate being connected to an output of said bistable means, and a second "and" gate having one input receiving pulses of said pulse former and having a second input connected to an output of said delay means, with an output of said second "and" gate being the output of said one-pulse gate-circuit means.

8. A system for detecting data modulated as phase-pulses onto a carrier frequency by synchronous phase-shifts, there being plural discrete phase-shifts coded for $n$ number of channels of digital data, comprising first means for storing the phase of one received phase-pulse at a time, second means for storing the phase of each previously received phase-pulse, first and second pulse-formers each having respective inputs connected to outputs of said first and second storing means, each pulse-former generating a pair of pulses from each received cycle corresponding to respective axis crossings, first and second full-wave detectors connected respectively to outputs of said first and second pulse-formers, one-pulse gate circuit means having a first input connected to an output of said first full-wave detector, a source of sampling pulses timed with the ends of said phase-pulses, a second input of said one-pulse gating circuit means being connected to said source of sampling pulses, said gate-circuit means passing one pulse received at its first input in response to each sampling pulse received at its second input, a gated pulse generator having an enabling input and a disabling input, said enabling input being connected to an output of said one-pulse gate-circuit means, and said disabling input being connected to an output of said second full-wave detector, pulse counter means being connected to an output of said gated pulse generator, phase sensor means for providing a signal when outputs of said first and second storing means are out of phase by more than 180°, a final stage of said pulse counter means having an input connected to an output of said phase sensor means, said counter being triggered to an output count in response to each sampling pulse, wherein the count of said counter following each sampling pulse is a demodulation of said phase-pulses.

9. A system, as defined in claim 8, in which said gated-pulse generator includes a delay means providing an output delayed by $$\frac{1}{2^n}$$

of a cycle from said first pulse former, an "or" gate having an output connected to an input of said delay means, one input of said "or" gate connected to the enabling input of said gated pulse generator, an "and" gate having an output connected to another input of said "or" gate, said "and" gate having another input connected to an output of said delay means, bistable means having set and reset inputs connected to the enabling and disabling inputs of said gated pulse generator, and the output of said "and" gate providing the output of said generator.

10. A system as defined in claim 8, having a one-pulse gate-circuit means including a first "and" gate, with one input connected to the output of said first pulse-former, a delay means with an input connected to an output of said first "and" gate, said delay means providing an output with a delay between one-half and one cycle from said first storing means, bistable means having a reset input connected to an output of said delay means, a set input of said bistable means being connected to said source of sampling pulses, an input of said first "and" gate being connected to an output of said bistable means, and a second "and" gate having one input receiving pulses from said first pulse-former and having a second input connected to the output of said delay means, with the output of said second "and" gate being the output of said one-pulse gate-circuit means.

11. A system, as defined in claim 8, in which said counter means count between 0 and $2^n$, a reset input of said counter means being connected to said sampling pulse source for being reset by starts of said sampling pulses, counter matrix means having at least $n$ number of outputs and having inputs connected to counter outputs, said matrix means translating counter output states to sequential output indications for respective output channels, a timing source having one-half the rate of received phase-pulses and being synchronized with them, said timing source being connected to said counter matrix means for alternately inverting channels made ambiguous by alternate storing of phase-pulses by said first and second storing means.

12. A system, as defined in claim 8, in which said phase sensor means includes a pair of inputs, with one input being connected to an output of said first storing means, and said second input being connected to an output of said second pulse-former, said phase sensor means including means for providing an output pulse when its inputs have either the same or opposite polarity.

13. A system, as defined in claim 12, in which said phase sensor means includes a wave squarer connected to one input, first and second "and" gates, each having at least three inputs, and each having one input connected to said source of sampling pulses, said first "and" gate having a second input connected to an output of said squarer, first inverter means connected between a third input of said first "and" gate and said second input of said sensor means, a second inverter connected between a second input of said second "and" gate and said squarer, a third input of said second "and" gate connected to an output of said second pulse-former, and an output "or" gate having a pair of inputs connected respectively to outputs of said first and second "and" gates, with an output of said "or" gate being the output of said phase sensor means.

No references cited.